(12) United States Patent
Ichikawa

(10) Patent No.: US 11,028,879 B2
(45) Date of Patent: Jun. 8, 2021

(54) SLIDING MEMBER

(71) Applicant: TAIHO KOGYO CO., LTD., Toyota (JP)

(72) Inventor: Masaya Ichikawa, Toyota (JP)

(73) Assignee: TAIHO KOGYO CO., LTD., Toyota (JP)

( * ) Notice: Subject to any disclaimer, the term of this patent is extended or adjusted under 35 U.S.C. 154(b) by 0 days.

(21) Appl. No.: 16/491,265

(22) PCT Filed: Jan. 11, 2019

(86) PCT No.: PCT/JP2019/000620
§ 371 (c)(1),
(2) Date: Sep. 5, 2019

(87) PCT Pub. No.: WO2019/198285
PCT Pub. Date: Oct. 17, 2019

(65) Prior Publication Data
US 2020/0392994 A1 Dec. 17, 2020

(30) Foreign Application Priority Data
Apr. 11, 2018 (JP) .............................. JP2018-076207

(51) Int. Cl.
*F16C 33/12* (2006.01)
*B22F 3/24* (2006.01)
(Continued)

(52) U.S. Cl.
CPC .............. *F16C 33/124* (2013.01); *B22F 3/24* (2013.01); *B22F 5/106* (2013.01); *B22F 7/08* (2013.01);
(Continued)

(58) Field of Classification Search
CPC ........ F16C 33/124; F16C 17/02; F16C 33/14; F16C 33/1025; F16C 2204/36; B22F 3/24; B22F 5/106; B22F 7/08; B22F 2003/242; B22F 2301/10; C10M 103/04; C10M 2201/053; C25D 7/10; C25D 3/56; C22C 9/02; C22C 1/0425; C10N 2050/08
See application file for complete search history.

(56) References Cited

U.S. PATENT DOCUMENTS 4,420,539 A 12/1983 Kostikov et al.
6,348,114 B1 * 2/2002 Oshiro ................ B22F 7/04
428/433

(Continued)

FOREIGN PATENT DOCUMENTS

AT 503735 A1 12/2007
AT 506641 A1 10/2009
(Continued)

OTHER PUBLICATIONS

International Search Report fpr PCT/JP2019/000620 dated Apr. 2, 2019 [PCT/ISA/210].
(Continued)

*Primary Examiner* — Taiwo Oladapo
(74) *Attorney, Agent, or Firm* — Sughrue Mion, PLLC

(57) ABSTRACT

A sliding member includes an overlay formed with an alloy plated film of Bi and Sb, the Sb concentration increasing in the overlay with the depth from the surface of the overlay.

1 Claim, 5 Drawing Sheets

(51) Int. Cl.
　　*B22F 5/10* (2006.01)
　　*B22F 7/08* (2006.01)
　　*C10M 103/04* (2006.01)
　　*C25D 3/56* (2006.01)
　　*C25D 7/10* (2006.01)
　　*F16C 17/02* (2006.01)
　　*C10N 50/08* (2006.01)
　　*C22C 1/04* (2006.01)
　　*C22C 9/02* (2006.01)
　　*F16C 33/10* (2006.01)
　　*F16C 33/14* (2006.01)

(52) U.S. Cl.
　　CPC ............. *C10M 103/04* (2013.01); *C25D 3/56* (2013.01); *C25D 7/10* (2013.01); *F16C 17/02* (2013.01); *B22F 2003/242* (2013.01); *B22F 2301/10* (2013.01); *C10M 2201/053* (2013.01); *C10N 2050/08* (2013.01); *C22C 1/0425* (2013.01); *C22C 9/02* (2013.01); *F16C 33/1025* (2013.01); *F16C 33/14* (2013.01); *F16C 2204/36* (2013.01)

(56) References Cited

U.S. PATENT DOCUMENTS

| 2004/0241489 | A1 | 12/2004 | Kawachi et al. |
| 2008/0102307 | A1 | 5/2008 | Zidar |
| 2018/0017107 | A1* | 1/2018 | Zidar ................... F16C 33/125 |

FOREIGN PATENT DOCUMENTS

| AT | 516877 B1 | 12/2016 |
| CH | 656562 A5 | 7/1986 |
| CN | 1240889 A | 1/2000 |
| CN | 102094900 A | 6/2011 |
| CN | 102933750 A | 2/2013 |
| CN | 104053918 A | 9/2014 |
| CN | 106460927 A | 2/2017 |
| CN | 107110210 A | 8/2017 |
| CN | 107250581 A | 10/2017 |
| DE | 3050427 A1 | 8/1982 |
| DE | 10 2004 025 560 A1 | 1/2005 |
| DE | 102007026832 A1 | 12/2007 |
| EP | 3259484 B1 | 12/2018 |
| GB | 2402135 A | 12/2004 |
| GB | 2 438 977 A | 12/2007 |
| JP | 2004-353042 A | 12/2004 |
| JP | 2006-266445 A | 10/2006 |
| JP | 2008-057769 A | 3/2008 |
| JP | 2018-513908 A | 5/2018 |
| KR | 10-2017-0120142 A | 10/2017 |
| WO | 81/03452 A1 | 12/1981 |
| WO | 2016/131074 A1 | 8/2016 |
| WO | WO-2016131074 A1 * | 8/2016 ............ F16C 33/121 |

OTHER PUBLICATIONS

Written Opinion fpr PCT/JP2019/000620 dated Apr. 2, 2019 [PCT/ISA/237].
Communication dated Apr. 27, 2020, from the German Patent and Trademark Office in application No. 112019000021.7.
Communication dated Apr. 14, 2020, from the National Intellectual Property Administration of People's Republic of China in Application No. 201980000993.3.

* cited by examiner

SLIDING MEMBER

CROSS REFERENCE TO RELATED APPLICATIONS

This application is a National Stage of International Application No. PCT/JP2019/000620 filed Jan. 11, 2019, claiming priority based on Japanese Patent Application No. 2018-076207 filed Apr. 11, 2018.

BACKGROUND OF THE INVENTION

1. Field of the Invention

The present invention relates to a sliding member including an overlay of an alloy plated film of Bi and Sb.

2. Description of the Related Art

A sliding member including an overlay containing a Bi coating layer and an Ag intermediate layer is known (see JP2006-266445 A). In JP2006-266445 A, the size of the Ag crystal grains in the intermediate layer is adjusted to improve the interlayer adhesion of the overlay. The size of the Bi crystal grains in the coating layer is also adjusted to improve the adhesion and the fatigue resistance of the overlay.

However, even if the interlayer adhesion is improved by adjusting the crystal grain size as in JP2006-266445 A, when the overlay has a two-layer structure, there is the problem that interlayer peeling cannot be avoided. There is also the problem that abrupt changes in the bearing properties cannot be avoided during wear when the overlay has a two-layer structure.

SUMMARY OF THE INVENTION

The present invention has been devised taking these problems into consideration, and it is an object of the present invention to provide a sliding member including an overlay that prevents interlayer peeling while achieving favorable fatigue resistance.

In order to achieve the object, the sliding member is including an overlay formed with an alloy plated film of Bi and Sb, in which the Sb concentration increases in the overlay with the depth from the surface of the overlay.

In the previously mentioned configuration, the overlay contains not only Bi, which is soft, but also Sb, which is hard, and the hard Sb improves the fatigue resistance. Because the Sb concentration increases with the depth from the surface, favorable conformability is achieved in the initial wear period, and high wear resistance is achieved in the stage of advanced wear. Because the Sb concentration increases with the depth from the surface, interlayer peeling can be prevented.

The concentration slope of Sb in a first region at a first depth from the surface of the overlay may be greater than the concentration slope of Sb in a second region at a depth from the surface of the overlay that is less than the first depth. With such a configuration, the hardness of the overlay can be abruptly increased with the advancement of wear.

It was confirmed that both conformability and fatigue resistance were achieved when the average concentration of Sb in the overlay overall was set to 1.3% to 3.0% by mass inclusive. The expression average concentration of Sb in the overlay means the average concentration of Sb taken throughout the depth from the surface of the overlay.

DETAILED DESCRIPTION OF EMBODIMENTS

Figure 1:
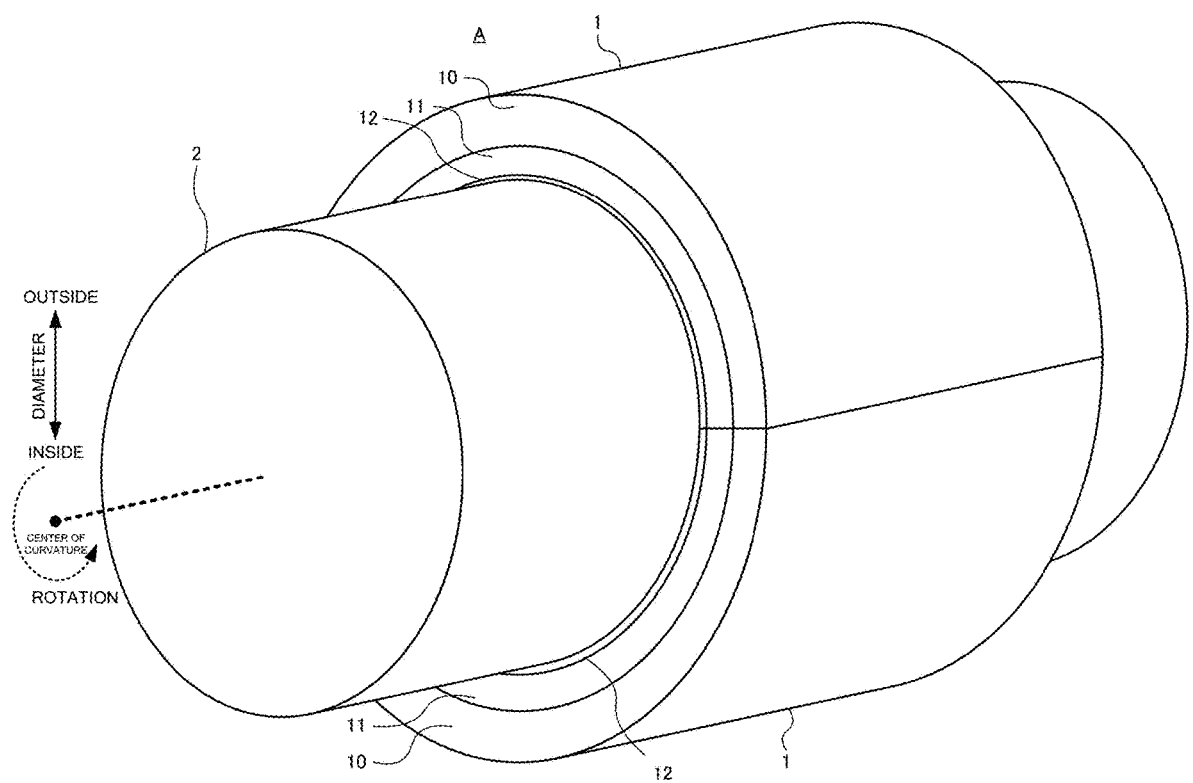
FIG. 1 is a perspective view of the sliding member according to the embodiments of the present invention.

Some embodiments of the present invention are described in the following order.
(1) First embodiment:
 (1-1) Configuration of the sliding member:
 (1-2) Method for manufacturing the sliding member:
(2) Other embodiments:

(1) First Embodiment (1-1) Configuration of the Sliding Member:

FIG. 1 is a perspective view of a sliding member 1 according an embodiment of the present invention. The sliding member 1 includes a back metal 10, a lining 11, and an overlay 12. The sliding member 1 is a half-split metal member formed by dividing a hollow tube into two parts in the radial direction and having a semi-circular arc cross section. A sliding bearing A is formed by assembling two sliding members 1 into a tubular shape. The sliding bearing A bears, in an internally formed hollow portion, a columnar counterpart shaft 2 (engine crankshaft). The outer diameter of the counterpart shaft 2 is formed slightly smaller than the inner diameter of the sliding bearing A. Lubricating oil (engine oil) is supplied in a gap formed between the outer circumferential surface of the counterpart shaft 2 and the inner circumferential surface of the sliding bearing A. With the lubricating oil thus supplied, the outer circumferential surface of the counterpart shaft 2 slides along the inner circumferential surface of the sliding bearing A.

The sliding member 1 is constructed by laminating the back metal 10, the lining 11, and the overlay 12, in order toward the center of curvature. Accordingly, the back metal 10 configures the outermost layer of the sliding member 1, and the overlay 12 configures the innermost layer of the sliding member 1. The back metal 10, the lining 11, and the overlay 12 each have a uniform thickness in the circumferential direction. The thickness of the back metal 10 is 1.8 mm, the thickness of the lining 11 is 0.2 mm, and the thickness of the overlay 12 is 20 µm. Twice the radius of the surface of the overlay 12 on the center of curvature side (inner diameter of the sliding member 1) is 55 mm. The width of the sliding bearing A is 19 mm. Hereinbelow, the term inside refers to the center of curvature side of the sliding member 1, and the term outside refers to the side opposite the center of curvature of the sliding member 1. The inside surface of the overlay 12 configures the sliding surface of the counterpart shaft 2.

The back metal 10 is formed from steel containing 0.15% by mass of C, 0.06% by mass of Mn, and the remainder of Fe. The back metal 10 need not be formed from steel as long as the back metal 10 is formed from a material that can support the load from the counterpart shaft 2 via the lining 11 and the overlay 12.

The lining 11 is a layer laminated on the inside of the back metal 10 and configures the base layer according to the present invention. The lining 11 contains 10% by mass of Sn, 8% by mass of Bi, and the remainder of Cu and unavoidable impurities. Examples of the unavoidable impurities of the lining 11 include Mg, Ti, B, Pb, and Cr, which are mixed in during refining or scrapping. The unavoidable impurity content in the lining 11 is 0.5% by mass or less of the total.

The overlay 12 is a layer laminated on the inside surface of the lining 11. The overlay 12 is an alloy plated film of Bi and Sb. The overlay 12 contains Bi, Sb, and unavoidable impurities. The unavoidable impurity content in the overlay 12 is 0.5% by mass or less of the total.

Figure 2:
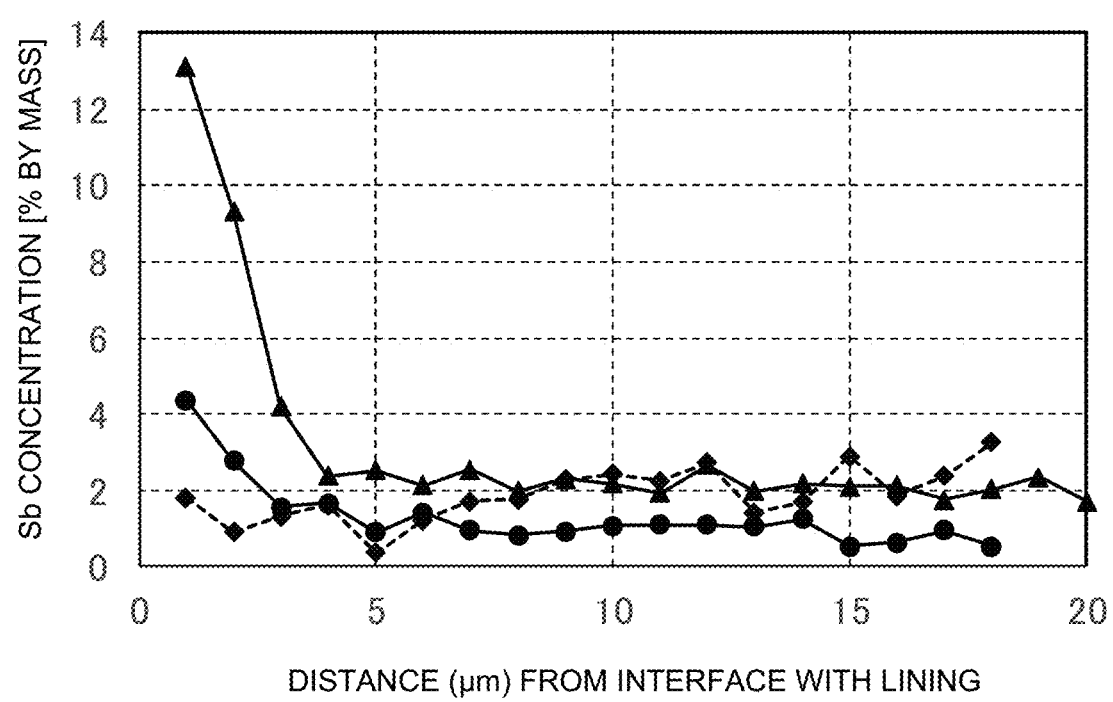
FIG. 2 is a graph of Sb concentrations in overlays.

Table 1 lists concentrations (mass concentrations) of Sb in the overlay 12. FIG. 2 is a graph illustrating concentrations (mass concentrations) of Sb in the overlay 12. In FIG. 2, the horizontal axis indicates the distance from a location within the overlay 12 of the sample A, B, or C to the interface with the lining 11, and the vertical axis indicates the Sb concentration at that location. Table 1 and FIG. 2 illustrate the concentrations of Sb in a sample A converging at approximately 2% by mass (triangles), the concentrations of Sb in a sample B converging at approximately 1% by mass (circles), and the concentrations of a sample C not having a concentration gradient (squares). As illustrated in FIG. 2, the Sb concentration is maximum at the interface with the lining 11 in the samples A and B. The Sb concentration drops

TABLE 1

| | DISTANCE FROM INTERFACE (μm) | FIRST REGION | | | | SECOND REGION | | | | | | | | | | | | | | | OVERALL AVERAGE CONCENTRATION | FIRST REGION/ SECOND REGION |
|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | | |
| Sb CONCENTRATION OF SAMPLE A | CONCENTRATION (% BY MASS) | 13.12 | 9.30 | 4.19 | 2.39 | 2.53 | 2.14 | 2.56 | 1.99 | 2.31 | 2.18 | 1.94 | 2.67 | 1.98 | 2.18 | 2.12 | 2.14 | 1.76 | 2.05 | 2.36 | 1.73 | 3.05 | — |
| | GRADIENT (% BY MASS/μm) | 3.82 | 5.11 | 1.80 | 0.14 | 0.39 | 0.42 | 0.57 | 0.32 | 0.13 | 0.24 | 0.73 | 0.69 | 0.20 | 0.06 | 0.02 | 0.38 | 0.29 | 0.31 | 0.63 | — | — | — |
| | GRADIENT AVERAGE (% BY MASS/μm) | | 2.72 | | | | | | | 0.36 | | | | | | | | 0.36 | | | | — | 7.6 |
| | STANDARD DEVIATION (% BY MASS) | | 4.89 | | | | | | | 0.27 | | | | | | | | 0.27 | | | | — | 18.1 |
| Sb CONCENTRATION OF SAMPLE B | CONCENTRATION (% BY MASS) | 4.37 | 2.78 | 1.57 | 1.66 | 0.90 | 1.42 | 0.96 | 0.83 | 0.94 | 1.07 | 1.11 | 1.11 | 1.05 | 1.26 | 0.53 | 0.63 | 0.95 | 0.55 | — | — | 1.31 | — |
| | GRADIENT (% BY MASS/μm) | 1.59 | 1.21 | 0.09 | 0.76 | 0.52 | 0.46 | 0.13 | 0.11 | 0.13 | 0.04 | 0.00 | 0.06 | 0.21 | 0.73 | 0.10 | 0.32 | 0.40 | — | — | — | — | — |
| | GRADIENT AVERAGE (% BY MASS/μm) | | 0.91 | | | | | | | 0.25 | | | | | | | | 0.25 | | | | — | 3.7 |
| | STANDARD DEVIATION (% BY MASS) | | 1.31 | | | | | | | 0.40 | | | | | | | | 0.40 | | | | — | 3.2 |
| Sb CONCENTRATION OF SAMPLE C | CONCENTRATION (% BY MASS) | 1.83 | 0.92 | 1.34 | 1.62 | 0.38 | 1.22 | 1.71 | 1.78 | 2.28 | 2.44 | 2.26 | 2.72 | 1.42 | 1.69 | 2.90 | 1.88 | 2.39 | 3.26 | — | — | 1.89 | — |
| | GRADIENT (% BY MASS/μm) | 0.91 | 0.42 | 0.28 | 1.24 | 0.84 | 0.49 | 0.07 | 0.50 | 0.16 | 0.18 | 0.46 | 1.30 | 0.27 | 1.21 | 1.02 | 0.51 | 0.87 | — | — | — | — | — |
| | GRADIENT AVERAGE (% BY MASS/μm) | | 0.71 | | | | | | | 0.61 | | | | | | | | 0.61 | | | | — | 1.2 |
| | STANDARD DEVIATION (% BY MASS) | | 0.39 | | | | | | | 0.98 | | | | | | | | 0.98 | | | | — | 0.4 | continuously in the samples A and B as the distance from a location within the overlay 12 to the interface with the lining 11 increases (i.e., as the depth from the surface of the overlay 12 decreases). The average concentration of Sb in the overlay 12 overall was 3.05% by mass.

In the samples A and B, as the distance from the interface with the lining 11 increases, the gradient of Sb concentration (absolute value) drops, and the Sb concentration converges to a nearly constant level in the region where the distance from the interface with the lining 11 is at least 4 µm. In the samples A and B, the gradient and standard deviation of Sb concentration in a first region (region where the distance from an interface X with the lining 11 is 4 µm or less) where the depth from the surface of the overlay 12 is a first depth are greater than the gradient and standard deviation of Sb concentration in a second region (region where the distance from the interface X with the lining 11 is greater than 4 µm) where the depth from the surface of the overlay is greater than the first depth.

In the sample A, the gradient of Sb concentration in the first region was 7.6 times the gradient of Sb concentration in the second region. In the sample A, the standard deviation of Sb concentration in the first region was 18.1 times the standard deviation of Sb concentration in the second region. In the sample B, the gradient of Sb concentration in the first region was 3.7 times the gradient of Sb concentration in the second region. In sample B, the standard deviation of Sb concentration in the first region was 3.2 times the standard deviation of Sb concentration in the second region.

The overlay 12 of the present embodiment was formed with a manufacturing method similar to that for the sample A, and the Sb concentration in the surface of the overlay 12 having a thickness of 20 µm was 1.8% by mass. Accordingly, it can be determined that there is a Sb concentration gradient in the present embodiment similar to that of the sample A in FIG. 2. The Sb concentration in the overlay 12 can be adjusted by varying the Sb concentration in the electroplating bath of the overlay 12 described below.

Figure 3:
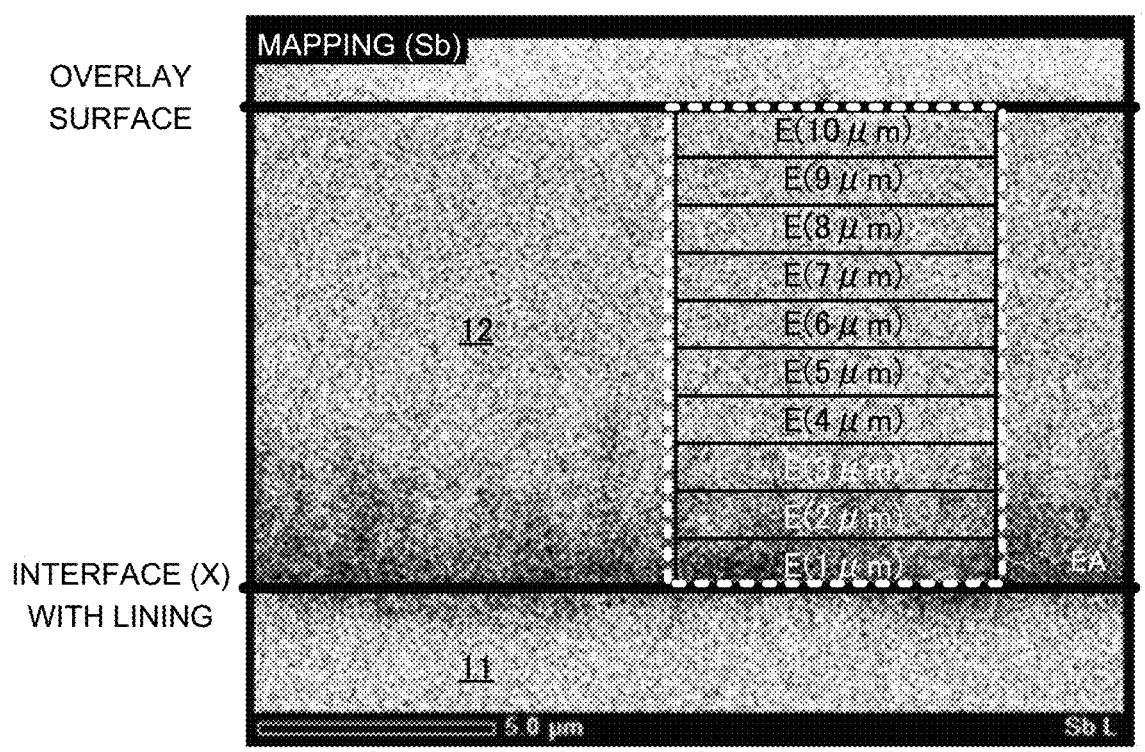
FIG. 3 is a photograph of the cross section of an overlay.

FIG. 3 is a cross-section photograph of the overlay 12. The cross-section photograph of FIG. 3 illustrates mapping carried out so that portions with a higher Sb concentration are darker in color. As illustrated in FIG. 3, the Sb concentration drops continuously as the depth from the surface of the overlay 12 decreases. That is, the Sb concentration rises continuously as the depth from the surface of the overlay 12 increases. Because the remainder except the Sb can be considered to be Bi, the Bi concentration drops continuously as the depth from the surface of the overlay 12 increases. That is, the Bi concentration continuously rises as the depth from the surface of the overlay 12 decreases. FIG. 3 is a photograph of the cross section of the overlay 12 with a thickness of approximately 10 µm.

The Sb concentration in the overlay 12 was measured with energy-dispersive X-ray spectroscopy using an electron beam microanalyzer (JMS-6610A, manufactured by JEOL). Specifically, a plurality of rectangular regions E with distances from the interface X between the overlay 12 and the lining 11 to the upper edge (edge of the surface side) differing by 1 µm were set, and the average mass concentration of Sb in each of the rectangle regions E was measured as the Sb mass concentration at each distance. An overall region EA composed of all of the rectangle regions E was set, and the average mass concentration of Sb in the overall region EA was measured as the Sb average concentration in the overlay overall.

Figure 4:
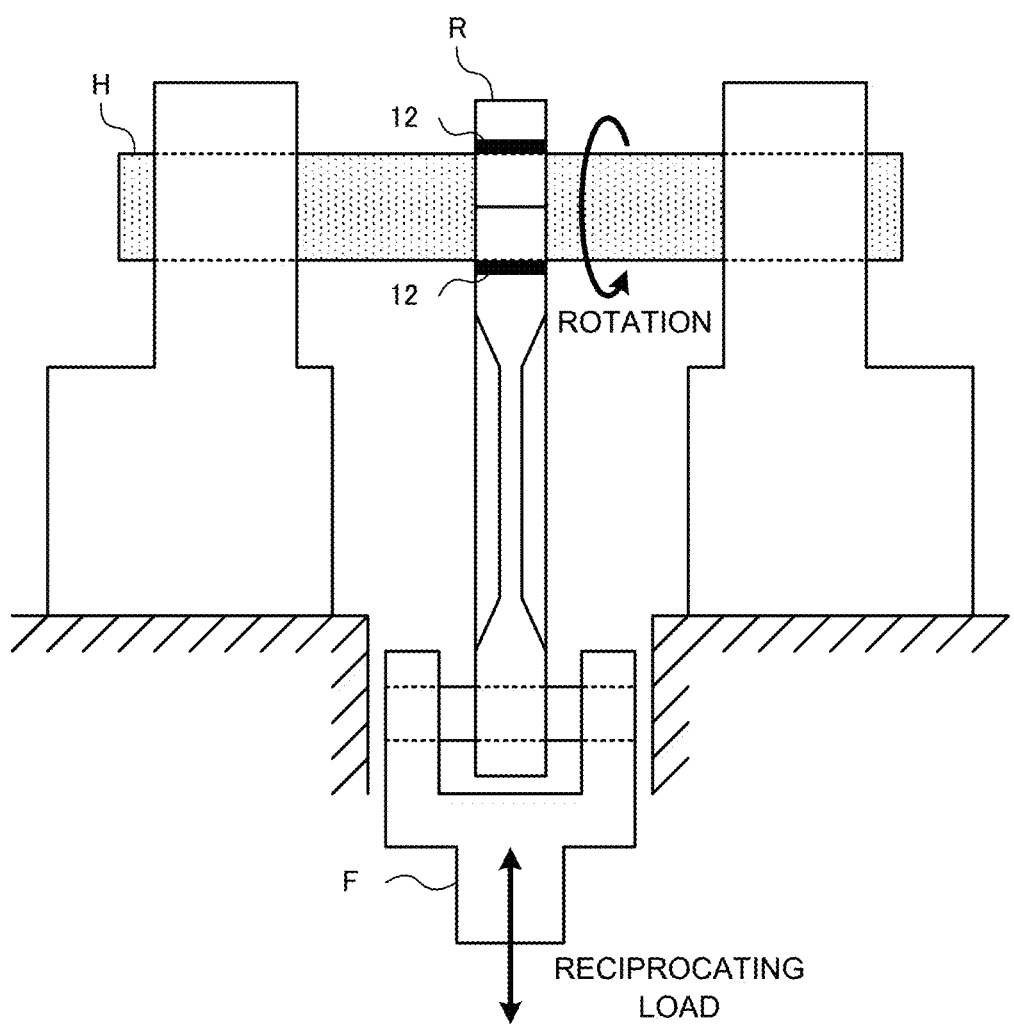
FIG. 4 is an explanatory view of a fatigue test.

When a fatigue test piece (connecting rod R) having an overlay 12 similar to the sliding member 1 described above was manufactured and the fatigue area ratio of the fatigue test piece was measured, the fatigue area ratio was 30%, which is favorable. The fatigue area ratio was measured with the following procedure. FIG. 4 is an explanatory view of the fatigue test. As illustrated in FIG. 4, the connecting rod R was formed with columnar through-holes at both ends in the longitudinal direction, and a test shaft H (hatched) was borne by the through-hole at one end.

An overlay 12 (black) was formed similar to that of the sliding member 1 in the inner circumferential surface of the through-hole of the connecting rod R that supports the test shaft H. The test shaft H was supported outside of the connecting rod R on both sides in the axial direction of the test shaft H, which was rotated at a sliding speed of 6.6 m/s. The term sliding speed is the relative speed between the surface of the overlay 12 and the test shaft H. The end of the connecting rod R on the side opposite of the test shaft H was connected to a moving body F that reciprocated in the length direction of the connecting rod R, and the reciprocating load of the moving body F was set to 80 MPa. Engine oil at approximately 140° C. was supplied between the connecting rod R and the test shaft H.

That state was maintained for 50 hours as the fatigue test on the overlay 12. After the fatigue test, the inside surface (sliding surface) of the overlay 12 was photographed from a position on a line orthogonal to the surface using the line as the main optical axis, and the photographed image was used as an evaluation image. Damaged portions of the surface of the overlay 12 illustrated in the evaluation image were identified by observation with binoculars (a magnifier), and the damaged surface area, which is the surface area of the damaged portions, was calculated. Specifically, the damaged surface area was divided by the entire surface area of the overlay 12 appearing in the evaluation image, and the result expressed in percentage which is fatigue area ratio, was obtained.

Since hard Sb is used as well as soft Bi in the overlay 12 in the present embodiment described above, the fatigue resistance is improved by the hard Sb. Because the Sb concentration increases with the depth from the surface, favorable conformability is achieved in the initial wear period, and high wear resistance is achieved in the stage of advanced wear. Because the Sb concentration increases with the depth from the surface, interlayer peeling can be prevented. Cu has the property of dispersing more easily than Bi in Sb. However, setting the average concentration of Sb in the overlay 12 overall to less than 3.1% by mass can suppress the amount of Cu dispersed from the lining 11 into the overlay 12 and prevent such a phenomenon that the otherwise dispersed Cu would drop the fatigue resistance.

The gradient of Sb concentration in the first region (region where the distance from the interface X with the lining 11 is 4 µm or less) where the depth from the surface of the overlay 12 is a first depth is greater than the gradient of Sb concentration in the second region (region where the distance from the interface X with the lining 11 is greater than 4 µm) where the depth from the surface of the overlay is greater than the first depth. Such a configuration rapidly increases the hardness of the overlay 12 with the advancement of wear.

(1-2) Method for Manufacturing the Sliding Member:

A low-carbon steel flat plate with the same thickness as the back metal 10 was prepared.

Powder of the material composing the lining 11 was dispersed on the flat plate formed with the low-carbon steel. More specifically, Cu powder, Bi powder, and Sn powder were dispersed on the low-carbon steel flat plate so as to have the mass ratio of the components in the lining 11 described above. Alloy powder of Cu—Bi, Cu—Sn, or the like may be dispersed on the low-carbon steel flat plate as long as the mass ratio of each component in the lining 11 is satisfied. The grain size of the powder was adjusted to no greater than 150 μm using a test sieve (JIS Z8801).

Then the low-carbon steel flat plate and the powder dispersed thereon were sintered. The sintering temperature was controlled to between 700° C. and 1000° C. and the sintering was carried out in an inactive atmosphere. After sintering, the result was cooled. The lining 11 need not be formed by sintering and may be formed, for example, by casting.

After the cooling was complete, a Cu alloy layer was formed on the low-carbon steel flat plate. The Cu alloy layer contained soft Bi particles that precipitated during the cooling.

Then the low-carbon steel formed with the Cu alloy layer was pressed so as to be a shape obtained by equally dividing a hollow tube into two parts in the radial direction. The pressing was carried out so that the outer diameter of the low-carbon steel matched the outer diameter of the sliding member 1.

Then the surface of the Cu alloy layer formed on the back metal 10 was cut. The amount of the cutting was controlled so that the thickness of the Cu alloy layer formed on the back metal 10 was identical to the thickness of the lining 11. The lining 11 was thereby formed from the Cu alloy layer after cutting. The cutting was carried out, for example, using a lathe set with a cutting tool, the material of which was formed with sintered diamond. The surface of the lining 11 after cutting composed the interface of the lining 11 and the overlay 12.

Next, the overlay 12 was formed by laminating Bi on the surface of the lining 11 to a thickness of 10 μm using electroplating. The electroplating procedure was as follows. First, the surface of the lining 11 was rinsed with water. The surface of the lining 11 was further washed with acid to remove unneeded oxides from the surface of the lining 11. Then the surface of the lining 11 was rinsed again with water.

After the pre-treatment described above was complete, an electrical current was supplied to the lining 11 immersed in a plating bath to carry out electroplating. The plating bath composition contained 150 g/L of methanesulfonic acid, 20 g/L of Bi methanesulfonic acid, and 25 g/L of an organic surfactant. 0.18 g/L of pure Sb was dissolved in the plating bath with electrolysis. The temperature of the plating bath was set to 30° C. A direct current with a current density of 2.0 A/dm$^2$ was supplied to the lining 11.

In the plating bath, the methanesulfonic acid can be adjusted between 50 and 250 g/L, the Bi methanesulfonic acid between 5 and 40 g/L, the Sb between 0.1 to 3 g/L, and the organic surfactant between 0.5 and 50 g/L. The temperature of the plating bath can be adjusted between 20° C. and 50° C., and the current density of the current supplied to the lining 11 can be adjusted between 0.5 and 7.5 A/dm$^2$. The Sb concentration in the overlay 12 can be raised by increasing the Sb ion concentration in the plating bath.

By setting, for example, the Sb concentration in the plating bath to 0.2 g/L, Sb concentrations (triangles) were obtained that converged on approximately 2% by mass in FIG. 2. By setting the Sb concentration in the plating bath to 0.1 g/L, Sb concentrations (circles) were obtained that converged on approximately 1% by mass in FIG. 2. It was understood that the Sb concentration gradients were achieved through the use of methanesulfonic acid in the plating bath. When the overlay 12 was formed in a plating bath using ethylenediaminetetraacetic acid (EDTA) instead of methanesulfonic acid, an overlay 12 without a concentration gradient was formed as in the sample C of FIG. 2.

Thus, electroplating was carried out, followed by rinsing and drying. The sliding member 1 was thereby completed. By assembling two of the sliding members 1 into a tube, the sliding bearing A was formed and then the sliding bearing A was attached to an engine.

(2) Other Embodiments

Figure 5:
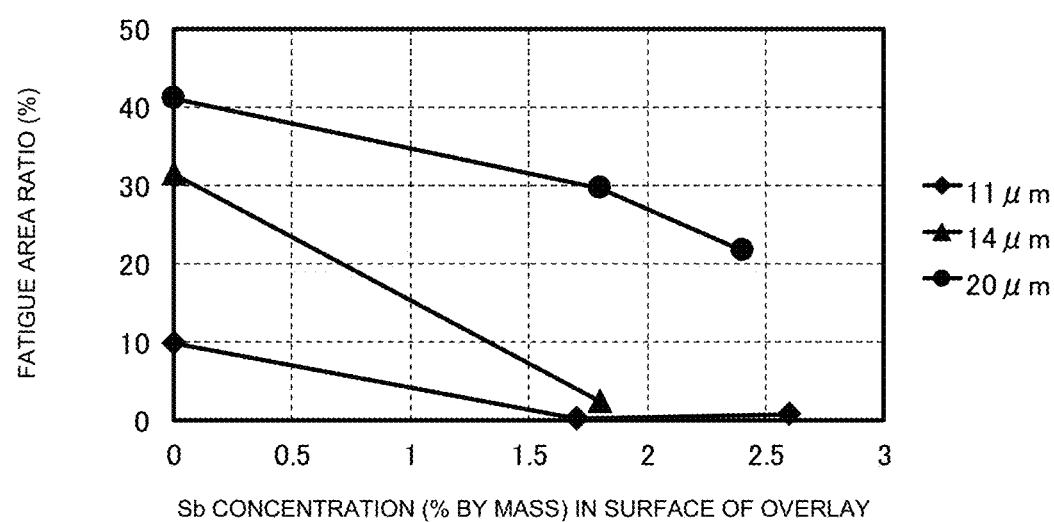
FIG. 5 is a graph illustrating the relation between the Sb concentration and the fatigue area ratio.

Table 2 lists the results from measuring the fatigue area ratio of a plurality of samples 1 to 8 for which the thickness of the overlay 12 and the Sb concentration in the surface were varied. The first embodiment corresponds to the sample 7. FIG. 5 is a graph of the fatigue area ratios of the samples 1 to 8. In FIG. 5, the vertical axis represents the fatigue area ratio, and the horizontal axis represents the Sb concentration in the surface.

TABLE 2

| SAMPLE NO. | OVERLAY THICKNESS (μm) | Sb CONCENTRATION (% BY MASS) IN SURFACE | FATIGUE AREA RATIO (%) |
|---|---|---|---|
| 1 | 11 | 0 | 9.9 |
| 2 | 11 | 1.7 | 0.2 |
| 3 | 11 | 2.6 | 0.8 |
| 4 | 14 | 0 | 31.5 |
| 5 | 14 | 1.8 | 2.4 |
| 6 | 20 | 0 | 41.1 |
| 7 (FIRST EMBODIMENT) | 20 | 1.8 | 29.6 |
| 8 | 20 | 2.4 | 21.8 |

The greater the thickness of the overlay 12 is, the greater the fatigue area ratio is. This result is thought to be due to the stress acting internally on the overlay 12 increasing when the thickness of the overlay 12 increases regardless of the Sb concentration. However, it was confirmed that using Sb in the overlay 12 successfully reduced the fatigue area ratio at all thicknesses. Accordingly, the sliding member 1 with favorable fatigue resistance can be formed even when the thickness of the overlay 12 is 20 μm as in the first embodiment.

Comparing fatigue area ratios with identical thicknesses, the fatigue area ratio can be suppressed with a higher Sb concentration in the surface. The fatigue area ratio can be suppressed by setting the Sb concentration in the surface to 1.0% to 3.0% by mass inclusive (desirably 1.7% to 2.6% by mass inclusive).

In the first embodiment, the sliding member 1 composing the sliding bearing A that bears an engine crankshaft was exemplified, but the sliding member 1 according to the present invention may be used to form the sliding bearing A for another purpose. For example, a gear bush for a transmission, or a radial bearing, such as a piston pin bush or a boss bush, may be formed with the sliding member 1 according to the present invention. The sliding member according to the present invention may also be a thrust bearing, any type of washer, or a swash plate for a car air compressor. The matrix of the lining 11 is not limited to a Cu alloy and may be selected from matrix materials according to the hardness of the counterpart shaft 2. The back metal 10 is not essential and may be omitted.

The invention claimed is:

1. A sliding member, comprising:
an overlay formed with an alloy plated film consisting essentially of Bi and Sb, wherein
the Sb concentration in the overlay increases as the depth from the surface of the overlay increases, and
the absolute value of the gradient of Sb concentration in a first region from a first depth from the surface of the overlay to a second depth from the surface of the overlay is greater than the absolute value of the gradient of Sb concentration in a second region from the surface of the overlay to the second depth from the surface of the overlay, the second depth is less than the first depth.

* * * * *